United States Patent [19]

Mäkeläinen et al.

[11] Patent Number: 5,600,636
[45] Date of Patent: Feb. 4, 1997

[54] METHOD FOR DIGITAL SEMI-DUPLEX TRANSMISSION

[75] Inventors: Kimmo Mäkeläinen, Helsinki; Mika Lehmusto, Kerava; Mika Heiskari, Espoo, all of Finland

[73] Assignee: Nokia Telecommunications OY, Espoo, Finland

[21] Appl. No.: 448,366

[22] PCT Filed: Sep. 26, 1994

[86] PCT No.: PCT/FI94/00431

§ 371 Date: Sep. 12, 1995

§ 102(e) Date: Sep. 12, 1995

[87] PCT Pub. No.: WO95/09497

PCT Pub. Date: Apr. 6, 1995

[30] Foreign Application Priority Data

Sep. 27, 1993 [FI] Finland .................. 934229

[51] Int. Cl.⁶ .................................................. H04L 5/16
[52] U.S. Cl. .................. 370/296; 370/350; 370/431
[58] Field of Search .................. 370/24, 84, 29, 370/118, 31, 32, 100.1, 105.4, 105.5, 101, 109, 103, 95.1, 95.3; 375/222, 354, 363, 365

[56] References Cited

U.S. PATENT DOCUMENTS

| | | | |
|---|---|---|---|
| 4,630,257 | 12/1986 | White | 370/29 |
| 4,949,335 | 8/1990 | Moore | 370/31 |
| 5,025,442 | 6/1991 | Lynk et al. | 370/29 |
| 5,095,540 | 3/1992 | Reed | 370/29 |
| 5,249,304 | 9/1993 | Mulford | 455/34.1 |
| 5,319,635 | 6/1994 | Reed et al. | 370/31 |

FOREIGN PATENT DOCUMENTS

| | | |
|---|---|---|
| 464955 | 7/1991 | Sweden . |
| 9109481 | 6/1991 | WIPO . |
| WO9509496 | 4/1995 | WIPO . |

OTHER PUBLICATIONS

Finnish Patent Application No. 934230, of Makelainen, filed Sep. 27, 1993.

*Primary Examiner*—Douglas W. Olms
*Assistant Examiner*—Ajit Patel
*Attorney, Agent, or Firm*—Cushman Darby & Cushman IP Group of Pillsbury Madison & Sutro LLP

[57] ABSTRACT

A method for digital semi-duplex transmission. To allow transmission of information to subscribers during the transmitting permission of one of the subscribers, a selected number (N−1) of blocks are transmitted during a time period shorter than the original total duration (t) of the blocks from a subscriber (MS A) having the permission to transmit to a base station (BS) having the permission to receive; the base station (BS) having the receiving permission utilizes the original total duration (t) of the blocks reduced by the actual transmission period of the blocks and by a first and a second guard period (301, 302) for transmitting reverse information (203) and time synchronization information (202) to the subscriber having the transmitting permission; and the base station (BS) having the receiving permission transmits information during at least one of said guard periods (301, 302) to at least one subscriber (MS B) having no transmitting permission. (FIG. 2)

4 Claims, 3 Drawing Sheets

METHOD FOR DIGITAL SEMI-DUPLEX TRANSMISSION

FIELD OF THE INVENTION

The invention relates to a method for digital semi-duplex transmission between subscriber stations and a base station in a radio system.

BACKGROUND OF THE INVENTION

The invention is concerned with semi-duplex FDMA mobile radio system comprising mobile exchanges, base stations and mobile radios and having a cellular configuration, each cell having one or more radio channels.

In semi-duplex FDMA mobile radio systems, it is usually impossible to interrupt a mobile radio during its transmitting permission and transmit signalling to the mobile radio as the mobile radio is not able to receive signalling during its transmission. This problem is solved in the same applicant's parallel application *Method for digital semi-duplex transmission* (FI 934230) by interrupting the transmission of the mobile radio at predetermined intervals and listening to reverse signalling transmitted by the base station. Reversing the direction of the radio parts of a semi-duplex mobile radio from transmission to reception before receiving and again from reception to transmission after signalling requires certain guard periods on both sides of the reverse signalling. Due to the regular frame structure of information to be transmitted, such guard periods are often used repeatedly, even though none of the transceivers is transmitting speech or data, that is, even when no reverse information is being transmitted. In practice, this means that the frame structure all the time contains idle time.

DISCLOSURE OF THE INVENTION

The object of the present invention is to dispense with the problem caused by the fact that unlike full-duplex FDMA and TDMA mobile radio systems, a semi-duplex FDMA mobile radio system does not allow a mobile radio to receive during its transmission. A radio station, such as a base station, having the permission to receive is not able to transmit any kind of information to a subscriber station having the permission to transmit. A base station having the permission to receive cannot interrupt the transmission of a subscriber station having the permission to transmit.

An object of the invention is to solve the above-described problem, i.e. how to interrupt the transmission of a semi-duplex mobile radio having the transmitting permission and to transmit reverse signalling to this subscriber station without interrupting or interfering with the speech or data transmission of the subscriber station having the transmitting permission. Another object of the invention is to solve the problem associated with the wasting of the signalling capacity of the base station, which is caused by the guard periods required for solving the above-described problem, as the subscriber station having the transmitting permission is not able to transmit or receive during the guard periods.

This new method for digital semi-duplex transmission between transceivers is achieved by a method according to the invention, which is characterized in that it comprises the following steps: a selected number of speech or data blocks are transmitted during a time period shorter than the original total duration of the speech or data blocks from a subscriber station having the permission to transmit to a base station having the permission to receive; the base station having the receiving permission utilizes the original total duration of the blocks reduced by the actual transmission period of the blocks and by a first and a second guard period for transmitting reverse information and time synchronization information to the subscriber station having the transmitting permission; and the base station having the receiving permission transmits information during at least one of said guard periods to at least one subscriber station which does not have the transmitting permission.

The idea of the invention can be presented in the following way. As speech or data information to be transmitted consists of blocks of fixed duration, a selected number of successive blocks are gathered up and transmitted over the radio path during a period of time shorter than their original duration. A period corresponding to the difference between the original duration of the blocks and the transmission period can thus be used for the transmission of reverse information and timing synchronization information from a transceiver having the receiving permission to a transceiver having the transmitting permission. When the radio station having the transmitting permission switches its transceiver from transmission to reception so as to receive reverse channel information, and correspondingly, when it switches its transceiver from reception to transmission, the time required for the switching of the transceiver is a guard period during which the subscriber station is not able to transmit or receive. The invention is based on the idea that the base station having the permission to receive is allowed to transmit information during the guard periods to subscriber stations other than the subscriber station having the permission to transmit.

An advantage of this inventive method is that the invention allows reverse information to be transmitted from a base station having the receiving permission to a subscriber station having the transmitting permission without causing a break to occur in the information transmitted from the subscriber station having the permission to transmit. This is an important feature especially in the transmission of speech information and in long-duration data transmissions with a low resistance to errors.

Another advantage of the invention is that the regular frame structure used in the reverse signalling channel establishment according to the invention ensures successful transmission of reverse signalling during a guaranteed maximum period. The use of a relatively long frame in reverse signalling reduces the possibility of an interpretation error caused by a short-duration radio channel interference.

Still another advantage of the method for digital semi-duplex transmission between transceivers is that the base station having the receiving permission is able to utilize the guard periods by transmitting information during them to subscriber stations other than the subscriber station having the transmitting permission.

BRIEF DESCRIPTION OF THE DRAWINGS

In the following the invention will be described more fully with reference to the attached drawings, where.

DETAILED DESCRIPTION OF THE INVENTION

Figure 1:
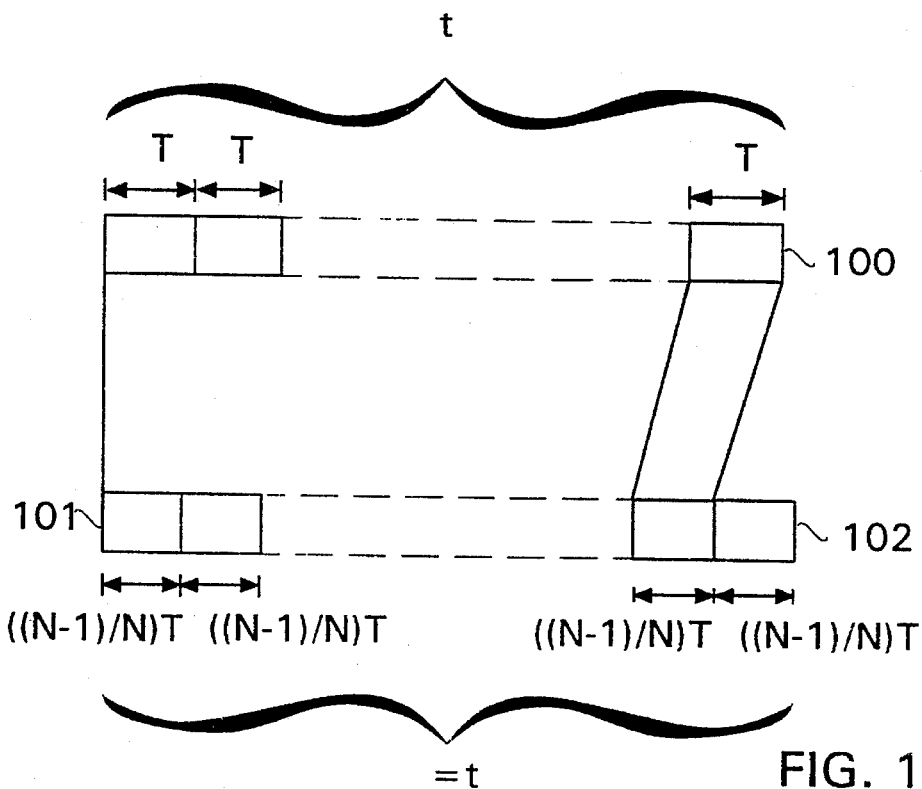
FIG. 1 shows a frame structure illustrating the rate change of speech or data information according to the invention.

FIG. 1 shows a frame structure illustrating the rate change of speech or data information according to the invention. The figure illustrates a certain time period t, during which an information signal occurs. This signal may be a data signal, which is already in digital form, or a speech signal; whereby it has been necessary to sample and/or digitally encode the audio signal. The time period t is divided into N−1 transmission frames or time slots, one time slot being indicated with the reference numeral 100. A predetermined amount of digital information is inserted in each time slot. According to the invention, the transmission rate of information to be transmitted in each time slot 100 is changed so that it can be inserted in a shorter time slot 101. The length of the original time slot can be indicated with T, and the length of the new time slot formed by changing the transmission rate e.g. by an equation $((N-1)/N)^*T$, if the duration of the original time period or multiframe is to be decreased by a single frame. Of course, the rate change could be greater, whereby the number 1 in the equation would be replaced with a greater number. In this way, a greater number of free frames could be obtained. In the solution described, the transmission rate is selected so that a speech block having duration T is transferred in a frame having a duration $((N-1)/N)^*T$, where each (N−1)th speech block will have a period of time of $((N-1)/N)^*T$ which is not needed for the transmission of speech information. Such an extra frame 102 is thus available once in each time unit $(N-1)^*T$, and it can be used for signalling.

Figure 2:
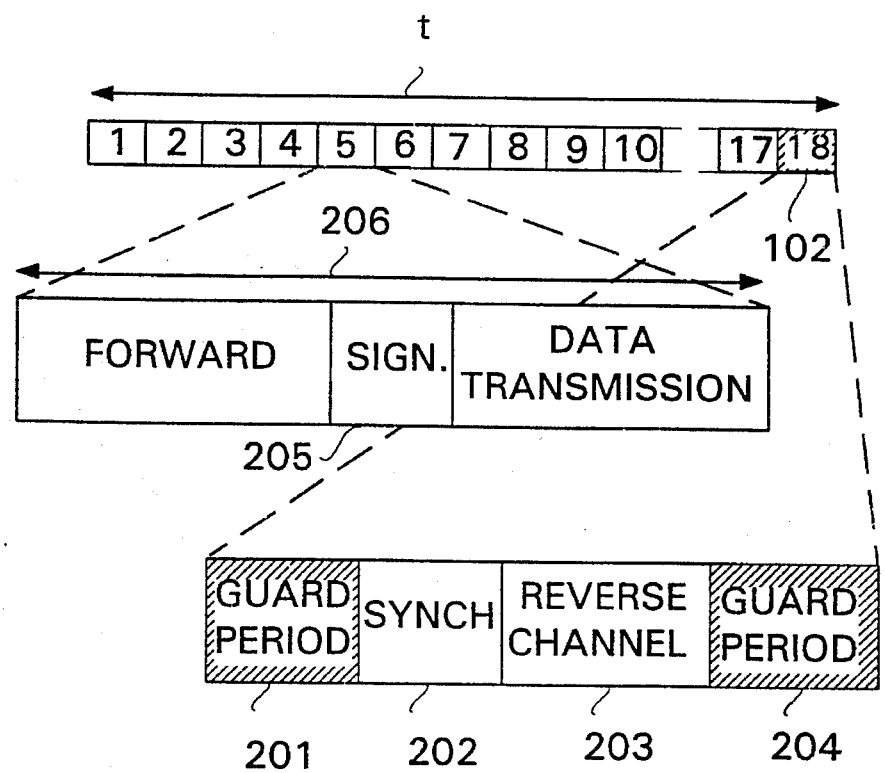
FIG. 2 shows the structure of a multiframe according to the invention.

FIG. 2 shows the structure of a multiframe t according to the invention. In the figure, frame 102 has been left free, i.e. available for the transmission of reverse information. In this case, frame 102 is positioned in the 18th time slot or frame of the multiframe. During each normal, i.e. forward-direction time slot 1 to 17, forward information and signalling data 205 are transmitted. This is illustrated by time slot 5, which is shown in more detail in frame 206. The reverse signalling channel according to the invention, that is, time slot 18, or frame 102, used in the transmission of the channel, will now be described more fully. It first comprises a guard period 201 in order that the subscriber station having the transmitting permission would have time enough to switch off its transmitter and switch on its receiver. The reverse-direction frame then comprises synchronization information 202, which may be time synchronization information or frequency synchronization information. Then the frame comprises a space reserved for reverse-direction information, i.e. for a reverse signalling channel 203. Finally, the frame again comprises a guard period 204, during which the transceiver having the transmitting permission will have time enough to switch its transceiver back to the transmission mode. One (here 102) of the frames of the period t, i.e. the multiframe, is used for signalling reverse to the transmission of the transmitting mobile radio. The guard periods are idle time both for the concerned mobile radio and the mobile radio system. They are necessary in order that the mobile radio would have time enough to switch its transceiver from transmission to reception, and vice versa. The base station having the receiving permission and transmitting reverse information does not need any guard periods, and it could transmit signalling even during the guard periods.

Figure 3:
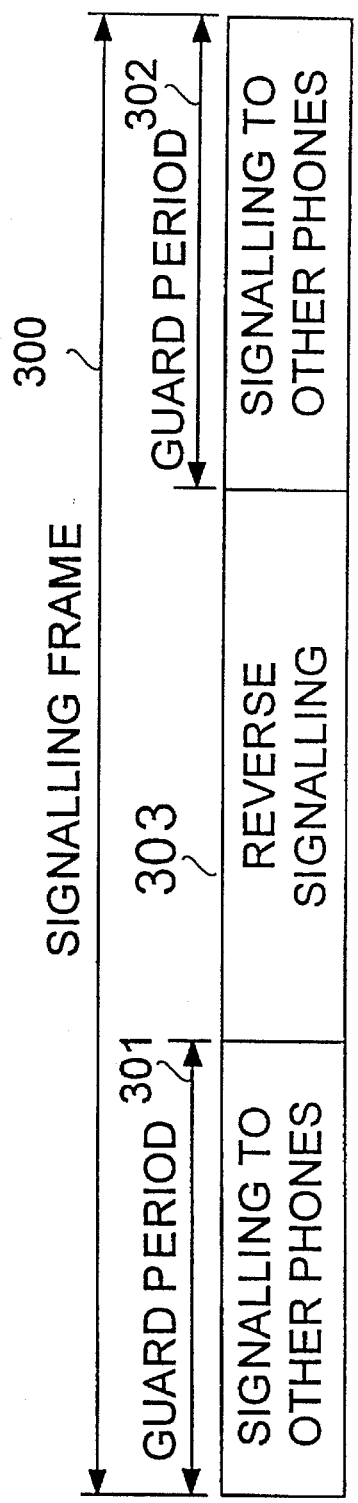
FIG. 3 shows the frame structure of a transmission frame according to the invention.

FIG. 3 shows the frame structure of a transmission frame according to the invention. In the figure, the period corresponding to a single frame 300 is divided into shorter periods, i.e. into a first guard period 301, a second guard period 302 and a period 303 during which the base station transmits reverse signalling to the subscriber station having the transmitting permission. During guard periods 301, 302, the base station transmits signalling to other subscriber stations within its coverage area. This signalling may be broadcast-type transmission intended for a great number or all of the mobile radios. In addition, the signalling may be addressed to a specific subscriber station or a group of subscriber stations.

Figure 4:
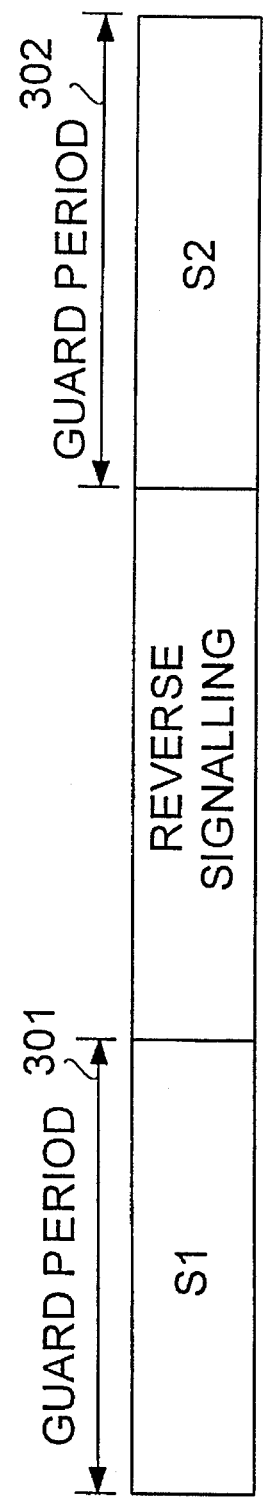
FIG. 4 shows the frame structure of a transmission frame according to the invention in a situation in which the first and the second guard period form separate entities.

FIG. 4 shows the frame structure of a transmission frame according to the invention in a situation in which the first and the second guard time form two separate entities. In the situation shown, the first guard period 301 and the second guard period 302 may form a common signalling entity intended for the same recipients. On the other hand, guard periods 301, 302 may both form a separate signalling entity S1, S2, which is intended for different recipients, or which produces a different response in each recipient.

Figure 5:
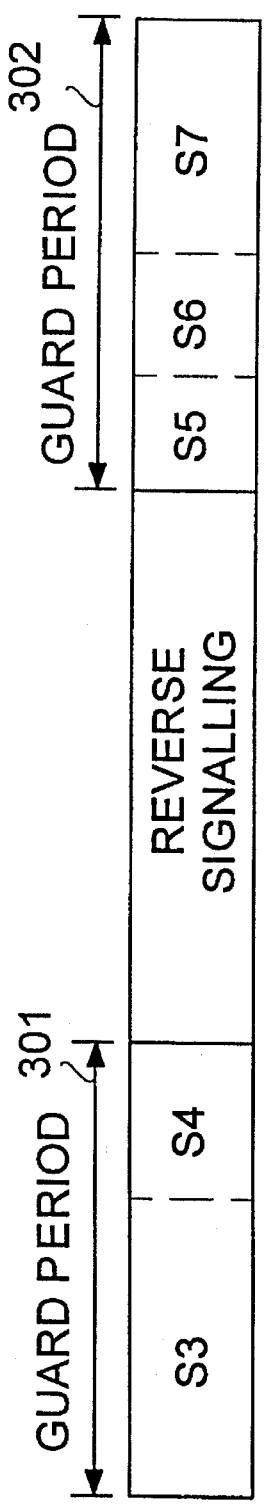
FIG. 5 shows the frame structure of a transmission frame according to the invention in a situation in which the first and the second guard time form several separate entities.

FIG. 5 shows the frame structure of a transmission frame according to the invention in a situation in which the first and the second guard period 301 and 302, respectively, consist of several separate entities S3, S4, S5, S6, S7. These entities may be intended for the same recipients or to different recipients. Signalling entities transferred in several successive reverse signalling blocks may also form larger information entities that are transferred to desired recipients. The scope of the invention covers both cases where the guard periods form a common signalling entity and cases where the guard periods are used as separate signalling events or they are divided into still smaller portions.

Figure 6A:
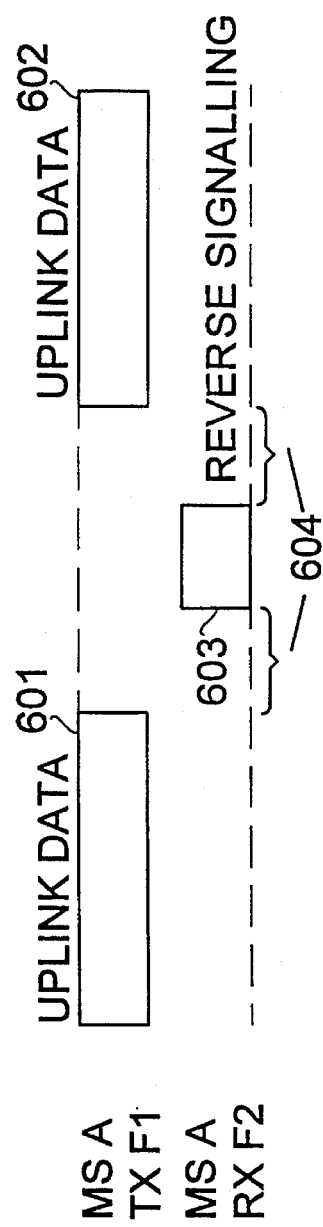
FIGS. 6a to 6c are frequency and time division diagrams illustrating a radio system utilizing the method according to the invention.
Figure 6B:
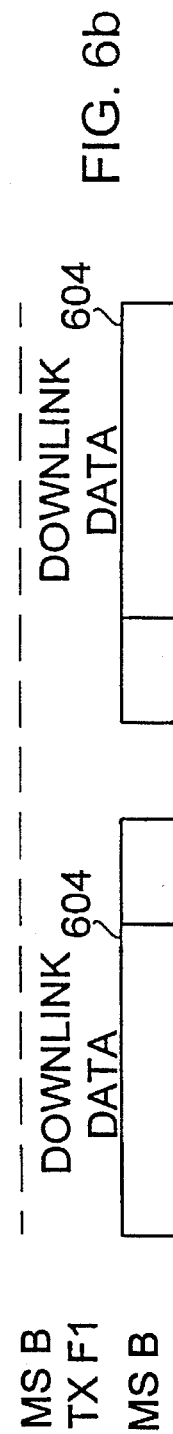
Figure 6C:
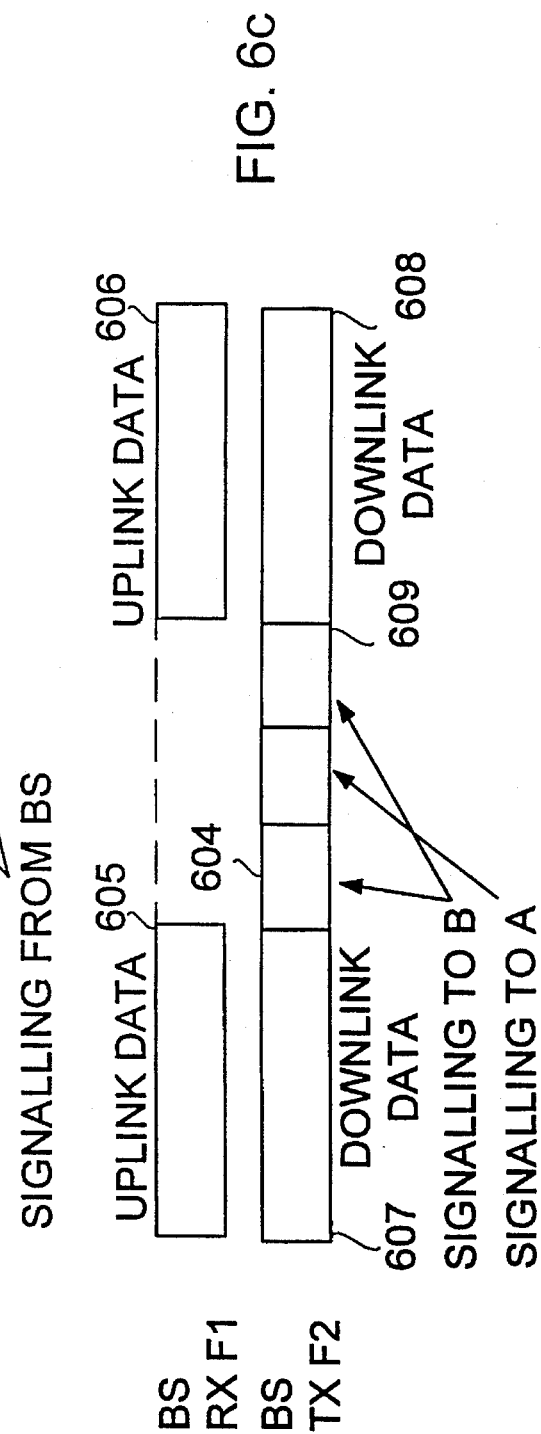

FIGS. 6a to 6c show a frequency and time division diagram in a radio system unitizing the method according to the invention. Events shown in the figures take place concurrently.

FIG. 6a shows a situation in which a subscriber station MS A transmits 601, 602 uplink information and intermittently tunes its transceiver TX/RX from a transmitting frequency F1 to a receiving frequency F2 in order to listen to reverse transmission 603 from a base station. The figure also shows guard periods 604 on both sides of reverse transmission 603 from the base station.

FIG. 6b shows how a subscriber station MS B receives transmission from the base station BS even during guard periods 604. The transceiver RX of subscriber station MS B is thereby continuously tuned to listen to receiving frequency F2. Subscriber station MS B thereby receives transmission from base station BS all the time except for a period during which the base station BS transmits reverse information addressed to subscriber station MS A. The base station thereby transmits signalling messages to subscriber station MS B during the guard periods.

FIG. 6c shows a situation in which the base station BS receives 605, 606 F1 uplink information transmitted by subscriber station MS A. At the same time, subscriber station MS B receives 607, 608 transmission from the base station BS at frequency F2. When guard period 604 starts, subscriber station MS A starts to switch its transceiver to listening mode, and subscriber station MS B listens to transmission from the base station. After subscriber station MS A has switched its transceiver to reception, it receives reverse channel transmission from the base station. During guard period 609, subscriber station MS B, in turn, has the permission to receive information from the base station. After the guard period has elapsed, subscriber station MS A again starts to transmit uplink information to the base station, and the base station transmits forward information to subscriber station MS B.

The drawings and the description related to them are only intended to illustrate the idea of the invention. In its details, the method according to the invention for digital semi-duplex transmission between subscriber stations and a base station in a radio system may vary within the scope of the claims. Even though the invention has been described above mainly with reference to semi-duplex FDMA radio systems, the invention can be applied to other radio systems as well.

We claim:

1. Method for digital semi-duplex transmission between subscriber stations and a base station in a radio system, characterized in that it comprises the following steps:

a selected number (N−1) of speech or data blocks are transmitted during a time period shorter than the original total duration (t) of the speech or data blocks from a subscriber station (MS A) having the permission to transmit to a base station (BS) having the permission to receive;

the base station (BS) having the receiving permission utilizes the original total duration (t) of the blocks reduced by the actual transmission period of the blocks and by a first and a second guard period (301, 302, respectively) for transmitting reverse information (203) and time synchronization information (202) to the subscriber station having the transmitting permission; and the base station (BS) having the receiving permission transmits information during at least one of said guard periods (301, 302) to at least one subscriber station (MS B) which does not have the transmitting permission.

2. Method according to claim 1, characterized in that the base station (BS) having the receiving permission transmits information addressed to a great number of subscriber stations (MS B) or to all of the subscriber stations during said guard periods (604).

3. Method according to claim 1, characterized in that said guard periods (301, 302; 604) are divided into portions (S3 to S7) during which the base station (BS) having the receiving permission transmits information to a different subscriber station (MS B) during each one of said portions.

4. Method according to claim 2, characterized in that said guard periods (301, 302; 604) are divided into portions (S3 to S7) during which the base station (BS) having the receiving permission transmits information to a different subscriber station (MS B) during each one of said portions.

* * * * *